United States Patent
Deng et al.

(10) Patent No.: US 8,819,108 B2
(45) Date of Patent: *Aug. 26, 2014

(54) SYSTEM AND METHOD SUPPORTING APPLICATION SOLUTION COMPOSITION ON CLOUD

(75) Inventors: Yu Deng, Yorktown Heights, NY (US); Alexei Karve, Mohegan Lake, NY (US); Andrzej Kochut, Croton on Hudson, NY (US); Randy Allan Rendahl, Raleigh, NC (US); Anca Sailer, Scarsdale, NY (US); Hidayatullah Habeebullah Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,988

(22) Filed: Aug. 27, 2012

(65) Prior Publication Data
US 2014/0052773 A1  Feb. 20, 2014

Related U.S. Application Data

(63) Continuation of application No. 13/589,499, filed on Aug. 20, 2012.

(51) Int. Cl.
*G06F 15/16* (2006.01)

(52) U.S. Cl.
USPC .................................................... 709/201

(58) Field of Classification Search
USPC .................................................... 709/201
See application file for complete search history.

(56) References Cited

U.S. PATENT DOCUMENTS

| | | | |
|---|---|---|---|
| 6,487,547 B1 | 11/2002 | Ellison et al. | |
| 7,870,550 B1 * | 1/2011 | Qureshi et al. | 717/174 |
| 8,392,902 B2 * | 3/2013 | Reinz | 717/168 |
| 8,417,938 B1 * | 4/2013 | Considine et al. | 713/151 |
| 8,468,535 B1 * | 6/2013 | Keagy et al. | 718/104 |
| 8,631,067 B2 * | 1/2014 | McWhirter et al. | 709/203 |
| 8,661,120 B2 * | 2/2014 | Atchison et al. | 709/224 |
| 2003/0149917 A1 | 8/2003 | Smith et al. | |

(Continued)

OTHER PUBLICATIONS

Zheng Li; O'Brien, L.; He Zhang; Cai, R., "On a Catalogue of Metrics for Evaluating Commercial Cloud Services," Grid Computing (GRID), Sep. 20-23, 2012, 2012 ACM/IEEE 13th International Conference, pp. 164-173.*

(Continued)

*Primary Examiner* — Eleni Shiferaw
*Assistant Examiner* — Nelson Giddins
(74) *Attorney, Agent, or Firm* — Harrington & Smith; Louis J. Percello

(57) ABSTRACT

Disclosed is a method, computer-program product and a system to compose an application solution on a cloud-computing platform for a user. The method includes, in response to input from the user, selecting at least one predetermined template that includes a hardware and software instance of a data processing system that is implementable as an solution on a cloud platform; comparing the at least one selected template against a set of constraints; establishing an instance of a cloud based solution for the user based on the selected template; and validating the established cloud based solution against user-uploaded information such as software and workloads to ensure that the solution satisfies requirements of the user, such as both technical and financial requirements of the user.

3 Claims, 4 Drawing Sheets

(56) References Cited

U.S. PATENT DOCUMENTS

| | | | |
|---|---|---|---|
| 2003/0192043 A1 | 10/2003 | Lin et al. | |
| 2004/0153438 A1* | 8/2004 | Rossiter et al. | 707/1 |
| 2006/0111880 A1* | 5/2006 | Brown et al. | 703/1 |
| 2006/0146879 A1* | 7/2006 | Anthias et al. | 370/471 |
| 2007/0078988 A1* | 4/2007 | Miloushev et al. | 709/227 |
| 2007/0203856 A1* | 8/2007 | Frohnhoefer et al. | 705/400 |
| 2008/0221941 A1* | 9/2008 | Cherkasova et al. | 705/7 |
| 2008/0244525 A1* | 10/2008 | Khalil et al. | 717/124 |
| 2009/0006519 A1* | 1/2009 | Nandan et al. | 709/200 |
| 2009/0133017 A1* | 5/2009 | Boogert et al. | 718/1 |
| 2009/0276771 A1* | 11/2009 | Nickolov et al. | 717/177 |
| 2010/0031247 A1* | 2/2010 | Arnold et al. | 717/174 |
| 2010/0169860 A1* | 7/2010 | Biazetti et al. | 717/107 |
| 2010/0192212 A1* | 7/2010 | Raleigh | 726/7 |
| 2010/0319004 A1* | 12/2010 | Hudson et al. | 719/313 |
| 2011/0072421 A1 | 3/2011 | Parry et al. | |
| 2011/0145790 A1* | 6/2011 | Rajaraman et al. | 717/124 |
| 2011/0231899 A1* | 9/2011 | Pulier et al. | 726/1 |
| 2012/0005341 A1* | 1/2012 | Seago et al. | 709/225 |
| 2012/0017112 A1* | 1/2012 | Broda et al. | 714/4.4 |
| 2012/0047240 A1* | 2/2012 | Keohane et al. | 709/221 |
| 2012/0066670 A1* | 3/2012 | McCarthy et al. | 717/169 |
| 2012/0072762 A1* | 3/2012 | Atchison et al. | 714/2 |
| 2012/0151358 A1* | 6/2012 | Joanny et al. | 715/736 |
| 2012/0185913 A1* | 7/2012 | Martinez et al. | 726/1 |
| 2012/0240135 A1* | 9/2012 | Risbood et al. | 719/328 |
| 2012/0311157 A1* | 12/2012 | Erickson et al. | 709/226 |
| 2013/0067298 A1* | 3/2013 | Li et al. | 714/799 |
| 2013/0152047 A1* | 6/2013 | Moorthi et al. | 717/124 |
| 2013/0232498 A1* | 9/2013 | Mangtani et al. | 718/104 |
| 2013/0282798 A1* | 10/2013 | McCarthy et al. | 709/203 |
| 2013/0290074 A1* | 10/2013 | Bash et al. | 705/7.39 |

OTHER PUBLICATIONS

Qian Zhu; Agrawal, G., "Resource Provisioning with Budget Constraints for Adaptive Applications in Cloud Environments," Oct. 2012, Services Computing, IEEE Transactions on, vol. 5, No. 4, pp. 497-511.*

Jenkins, W.; Vilkomir, S.; Sharma, P.; Pirocanac, G., "Framework for testing cloud platforms and infrastructures," Dec. 12-14, 2011, Cloud and Service Computing (CSC), 2011 International Conference, pp. 134,140.*

* cited by examiner

US 8,819,108 B2

SYSTEM AND METHOD SUPPORTING APPLICATION SOLUTION COMPOSITION ON CLOUD

CROSS-REFERENCE TO A RELATED US PATENT APPLICATION

This patent application is a continuation application of copending U.S. patent application Ser. No. 13/589,499 filed Aug. 20, 2012, the disclosure of which is incorporated by reference herein in its entirety.

TECHNICAL FIELD

The exemplary embodiments of this invention relate generally to data processing systems, methods and computer software, and relate more specifically to determining a user-optimized application solution on a cloud platform.

BACKGROUND

A cloud platform can be considered to be a collection of data processing hardware and software that is configured to address the needs of a user. The data processing hardware and software can be considered from the user's perspective as a virtual assemblage of data processing hardware and software that is hosted by a provider of the cloud platform, i.e., the actual physical hardware and software components such as computers, servers, storage devices, operating systems, middleware, databases, network interfaces and the like are not hosted by the user but instead by the cloud platform provider.

In a market place associated with a cloud platform provider a user searches for a solution (e.g., bundling certain catalog items or composing services) to serve the user's needs. A number of issues can arise from the user's perspective when searching for an optimum cloud platform solution. These issues can include one or more of the following (as examples).

(a) How does the user ensure that a given solution is technically sound?

(b) How does the user find a highest performing solution within the budgetary constraints of the user?

(c) How does the user find a lowest priced solution that will still fulfill the needs of the user?

The exemplary embodiments of this invention address and solve these and other issues that can arise when configuring a solution on a cloud platform.

SUMMARY

An aspect of the exemplary embodiments of this invention provides a system that includes at least one computer connected with at least one memory that stores computer program code executable by the at least one computer. The system further includes a user interface connected with the at least one computer. In the system execution of the computer program code results in performance of operations that comprise, in response to input from a user received via said user interface, accessing a database to select at least one predetermined template comprised of a hardware and software instance of a data processing system that is implementable as an application solution on a cloud platform; comparing the at least one selected template against a set of constraints; establishing an instance of a cloud based solution for the user based on the selected template if the set of constraints is compatible with requirements of the selected template; and validating the established cloud based solution against user-uploaded software and workloads to ensure that the cloud based solution satisfies requirements of the user.

DETAILED DESCRIPTION

Figure 1:
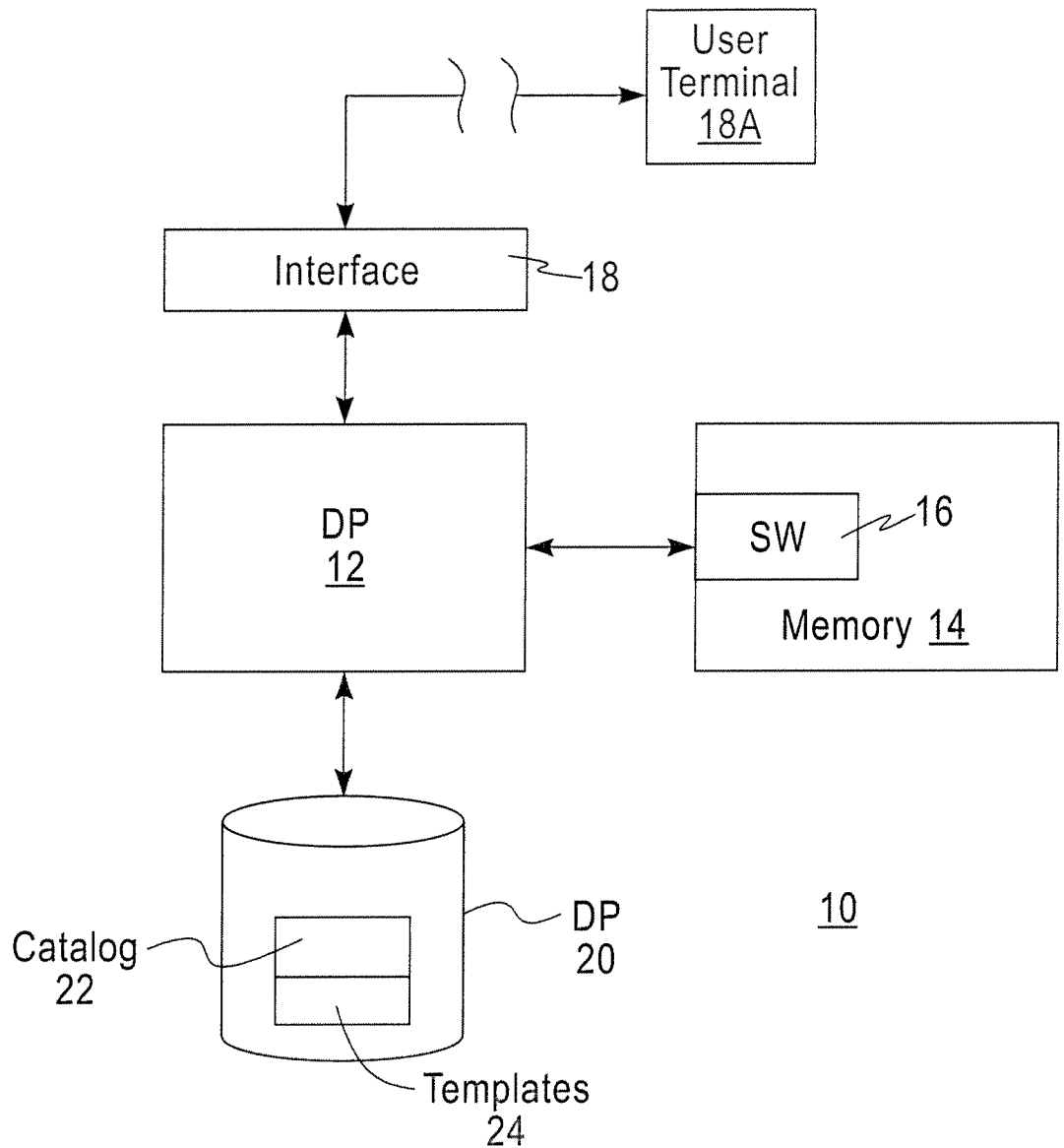
FIG. 1 depicts a block diagram of one suitable embodiment of a system that is capable of implementing the embodiments of this invention.

The various embodiments of this invention provide tools, methodologies, systems and software to enable the user to arrive at an optimum cloud application solution that meets the operational constraints of the user's workload characteristics, such as throughput, availability and storage capacity, within budgetary constraints imposed on the user. The various embodiments merge technical and business aspects and suggest to the user a solution based on the user's workload characteristics and budget.

The use of the embodiments of this invention creates a number of technical solutions along with required supporting components. The embodiments create the technical solutions based at least on user input and technical feasibility, and operate to ensure that a composition of the resources in the solution is technically sound.

The embodiments of this invention can vary the metal (hardware, such as CPU, memory and storage) and supporting image (e.g., software such as middleware that operates beneath a user's application software) to support the suggested solutions. For each technical solution the embodiments compute a correct combination of metal and the supporting image to host the solution. The computation can consider a license model which could limit the number possible combinations and also affect a pricing computation. For example, a particular database could have enhanced performance when executed on a server with four CPUs rather than on a server with two CPUs, but it may require a more expensive license from the database vendor in order to be deployed on the higher performance capacity server.

The embodiments of this invention also create associations between each solution and different combinations of metal and supporting image.

An aspect of the embodiments of this invention is a computation of the cost of these different associations. This can be a multi-step process that involves computing the cost of a particular technical solution and computing the correct charge for the different associations.

Computing the cost of a technical solution can involve, for example, a generally per resource cost of management (possibly by type), a consideration of a base computer resource consumption (computer, required physical storage, etc.), as well as any software licensing fees by license metric. These license metrics can include, for example, a number of CPUs, expected numbers of system users (e.g., customers or clients of the user), the number of connections, etc.) In the case of using a public cloud some of these computations can be simplified by basic pricing information being available that masks from the user some or all of the detailed breakout.

Note that while a public cloud is mainly considered herein the embodiments of this invention can be applied equally to a 'private' cloud environment, such as a cloud maintained by an organization such as an agency or a corporate enterprise for use by its employees and contractors. In such a case, and by example, a particular user can still be bound by departmental budgetary and other constraints when configuring a cloud platform solution to perform a certain task.

The embodiments of this invention compute the cost of the different combinations of the metal and the supporting image, compute the total cost of the different associations between the technical solutions and the combinations, and compute a correct amount to be charged to the user for the different associations.

An aspect of the embodiments of this invention is an ability to iterate a set of the different associations between the technical solution and the combinations if there is a shortfall between the various solution prices and the budget of the user. The iteration can involve varying the resources of the solutions to possibly arrive at better technical solutions, and then computing the prices of the better technical solutions with different combinations of metal and supporting images to ensure that the computed prices are still within the user's budget.

With regard to recommending optimal solutions, another aspect of the embodiments of this invention is selecting a subset of the combinations whose charge (price) does not exceed the user's budget. This subset includes those solutions which provide the best performance within the budgetary limit and those solutions which satisfy the technical requirements, but with the lowest prices.

With regard to computing the technical performance of selected combinations, another aspect of the embodiments of this invention is accommodating the fact that certain combinations of metal and supporting image can host the created solutions, but may not have the best technical performance in terms of, for example, throughput, overhead and reliability.

With regard to recommending the combinations with the best performance margin, another aspect of the embodiments of this invention involves recognizing that the derived set of solutions includes both cost effective solutions and higher capacity solutions having prices that can be near to the budgetary limit of the client.

Before continuing with the detailed description of the embodiments of this invention reference can be made to FIG. 1 for showing a block diagram of one suitable embodiment of a system 10 that is capable of implementing the embodiments of this invention. System 10 can be assumed to be associated with a cloud platform provider/vendor/source and includes at least one data processor (DP) 12 containing at least one CPU that is connected with at least one memory 14, such as one or more of semiconductor-based memory and disk-based memory, that stores computer program code or software (SW) 16. The SW 16, when executed by the at least one data processor 12, results in performance of operations that implement the methods of this invention. Also connected to the data processor 12 is at least one interface (IF) 18 through which a user, also referred to herein as a client, can interact with the system 10 via a suitable user terminal 18A. The interface 18 can be a network interface such as one or both of a local area network (LAN), including a wireless LAN (WLAN), or a wide area network (WAN), including the internet, and preferably implements a user interface (UI) via the SW 16 with the client such as by the use of drop-down menus (e.g., boxes) and/or any suitable UI screens, etc. Also connected with the data processor 12 can be at least one database 20 that stores at least a catalog 22 of available Cloud platform hardware and software that is capable of being configured based on the user's needs and budgetary constraints as will be detailed in FIG. 2. The database 20 can also store what will be referred to as templates 24 or bundled topologies (e.g., 'best practice topology templates'). In general the SW 16 operates with catalog 22 and other information, including the templates 24 which can be stored in the database 20, to implement the embodiments of this invention.

It should be noted that the actual cloud platform hardware and software (e.g., CPUs, storage devices, database managers, operating systems, etc.) could be co-located with the system 10, or it could be physically present at some other location, or it could in actuality be widely distributed over a number of locations. The actual implementation and location or locations of the instantiations of the underlying cloud platfoim hardware and software is not particularly germane to the description of the embodiments of this invention.

Figure 2A:
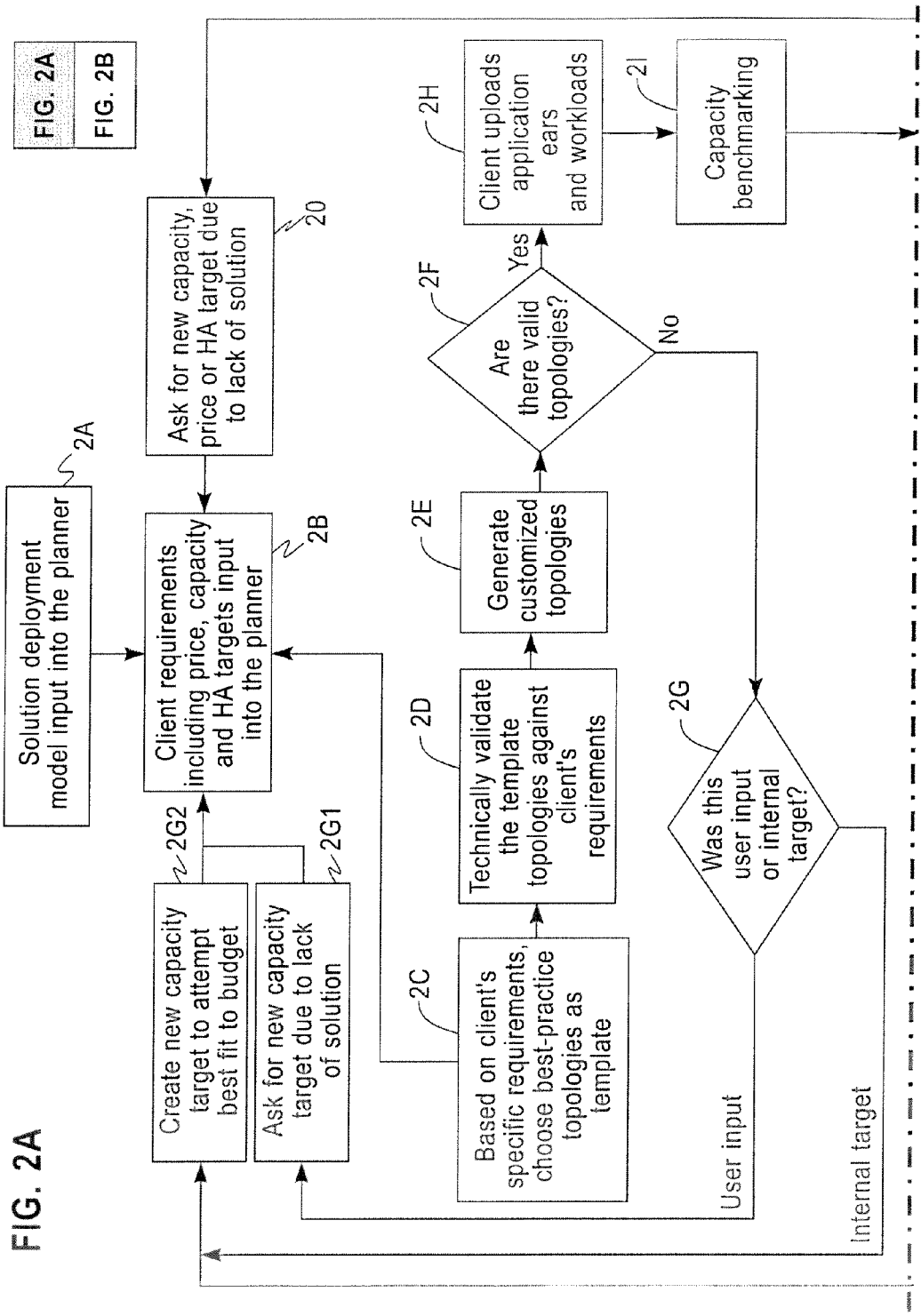
FIG. 2A-2B is a logic flow diagram that shows the operation of a method of this invention, where the method implements a multi-step solution composition and benchmarking process to establish an instance of a cloud application solution for a user.
Figure 2B:
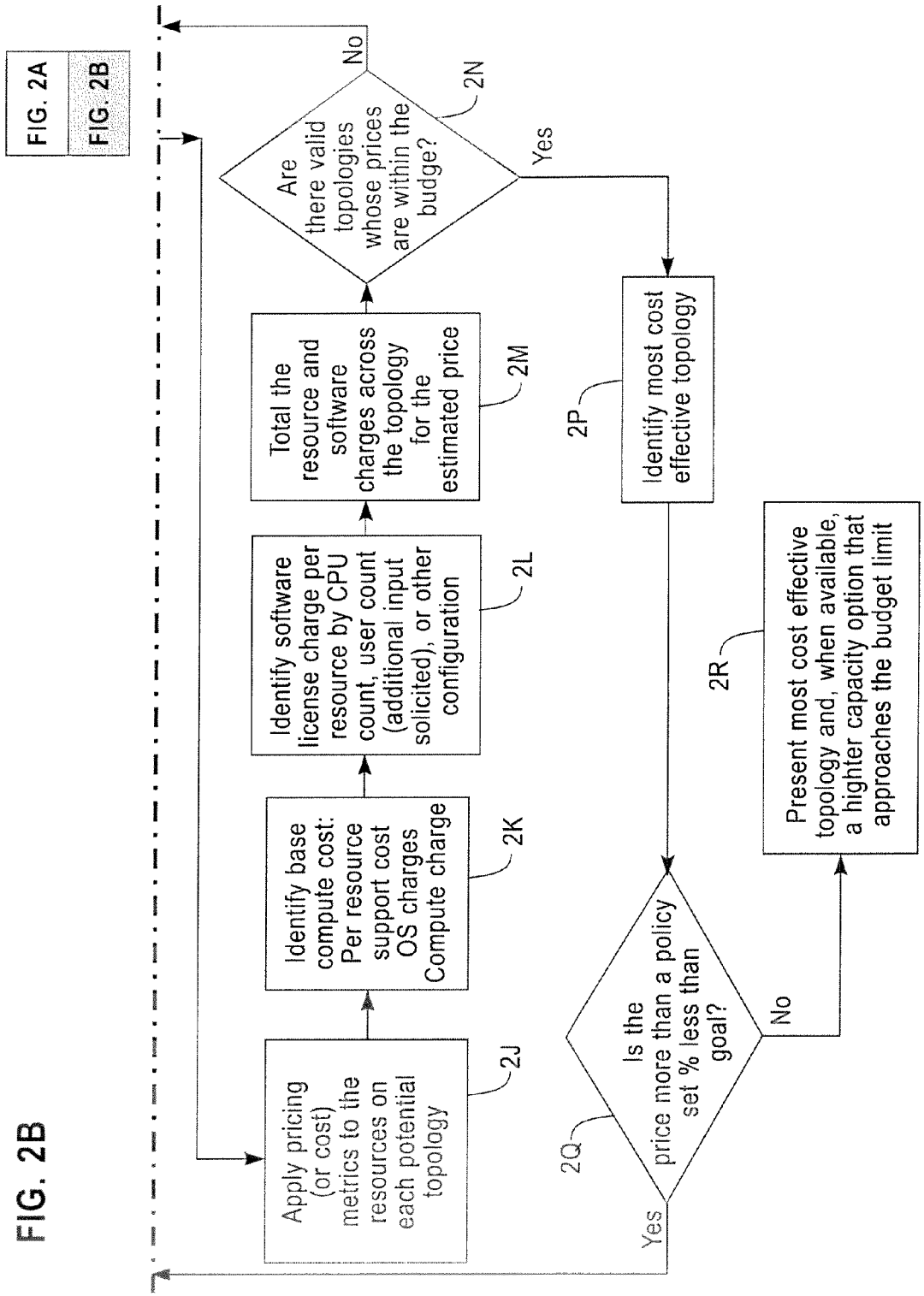

FIG. 2 is a logic flow diagram that shows the operation of a method of this invention. Briefly, the method implements a multi-step solution composition and benchmarking process that can be characterized as follows.

2A. Solution deployment model input is comprised of inputting from the client mainly functional requirements: e.g., a functional specification (e.g., response time), number of persons (e.g., customers) to be simultaneously supported.

2B. Non-functional requirements are also input from the client, which can include: constraints: e.g., price constraints, license capacity; and any high availability (HA) requirements: e.g., avoidance of single point of failure, percentage of time the solution must be operational (e.g., 24/7, normal business hours only, etc.) Such high availability requirements can also be referred to as "resiliency requirements" of the client/user.

The system 10 generates a customized topology based on the client's specific requirements. This can involve the following:

(2C) based on the client's specific requirements, choosing best-practice topologies (from the templates 24 in database 20) as working templates, for example, cloud specific resource sizes can be applied to the model to identify potential deployment topologies that satisfy the capacity targets, and each tier of resources has each compute size applied thereto;

(2D) technically validating the template topologies against the client's requirements; and (2E) generating customized topologies by varying the combinations of software and underlying infrastructure support in the template topologies and expanding the topology design to meet any HA requirements. For example, combinations of tiers are estimated and resource counts are identified when possible in this step.

2H. If a valid topology has been identified at this point the client uploads software and workloads. The software can be considered as the client's own application code, i.e., a client application to be deployed on the eventually configured cloud platform. This type of software is sometimes referred to as "ear files".

2I. The system 10 benchmarks (e.g., the system 10 validates, assesses and/or tests) the capacity of the customized topology or topologies. This can involve:

(1) using a workload generator (e.g., such as a conventional workload generator application), generating different workloads for measuring the different bundling in the topologies;

(2) deploying the client uploaded software and workloads on top of the topologies and testing the topologies with the deployed software and workloads; and (3) testing both the horizontal/vertical scaling capabilities and HA requirements. Horizontal scaling involves adding more nodes to a system, for example, scaling out from one Web server system to three, while vertical scaling means adding resources to a single node in a system.

Describing FIG. 2 now in more detail, at block 2A: a solution deployment model is input into a planner that forms a part of the software 16. At block 2B the client requirements, including price, capacity and HA targets are input into the planner via the interface 18 shown in FIG. 1. The client can be prompted via the UI to enter, for example, the client's budgetary and technical requirements as well as the workloads and software. At block 2C, based on client's specific requirements, the method chooses at least one of the best-practice topologies as a template (a working template). At block 2D the method technically validates the template topologies against the client's requirements. At block 2E the method generates customized topologies. At block 2F a determination is made if there are there any valid cloud topologies that are available to meet the client's requirements. If the result of the determination is negative at block 2G a determination is made if the failure to arrive at a valid topology was due to user input or internal target data. In the case of user input data control passes to block 2G1 to request the client to enter a new capacity target, while if the failure to arrive at a valid topology was due to internal target data control passes to block 2G2 to create a new capacity target to attempt a best fit to the client's budget. Note that if one or more of the iterations through this loop are unsuccessful the client may be informed that the client's performance goals are not compatible with, for example, the client's budgetary constraints and/or high availability (HA) requirements/expectations, or with the capabilities of the particular cloud platform provider to prove the requested service within the client's budgetary and other requirements. In either the case of block 2G1 or 2G2 control passes back to block 2B.

Assuming now that the determination at block 2F is positive (i.e., there is at least one valid cloud platform topology) control passes to block 2H to prompt the client via the UI to upload via the network interface 18 the client software and workloads and to receive same. At block 2I capacity benchmarking (evaluation, assessment and testing) is performed. Next, both pricing and license constraints are taken into account. This entails, for example, at block 2J applying pricing (cost) metrics to the Cloud platform resources for each potential topology. At block 2K there is a step of identifying a base compute cost, for example, per resource support costs, an operating system (OS) cost and more generally computing charges. At block 2L the system 10 identifies any software license charges per resource by CPU count, user count (additional input solicited), or other configurations. At block 2M the system 10 totals the resource and software charges across the topology for the estimated price. At block 2N there is a determination as to whether there are any valid topologies thus evaluated whose prices (cost to the client) are within the budget of the client. If the determination is negative, control passes to block 2O to request from the client a new capacity, price or HA target due to lack of a viable cloud based solution. If the determination at block 2N is affirmative control passes to block to 2P to identify a most cost effective topology. At block 2Q a determination is made if the price (cost to the client) computed thus far is more than some policy set percentage less than the goal (identified maximum cost). If yes, control passes back to block 2G2 to create the new capacity target via interaction with the client, otherwise control passes to block 2R to present what is the currently most cost effective topology and, when available, a higher capacity option that is also within the client's budgetary constraints. At this point the client has the opportunity to select a cloud based solution from one or more potential cloud based solutions, as it can be assumed that at least one offered topology satisfies the requirements of the client.

Figure 3:
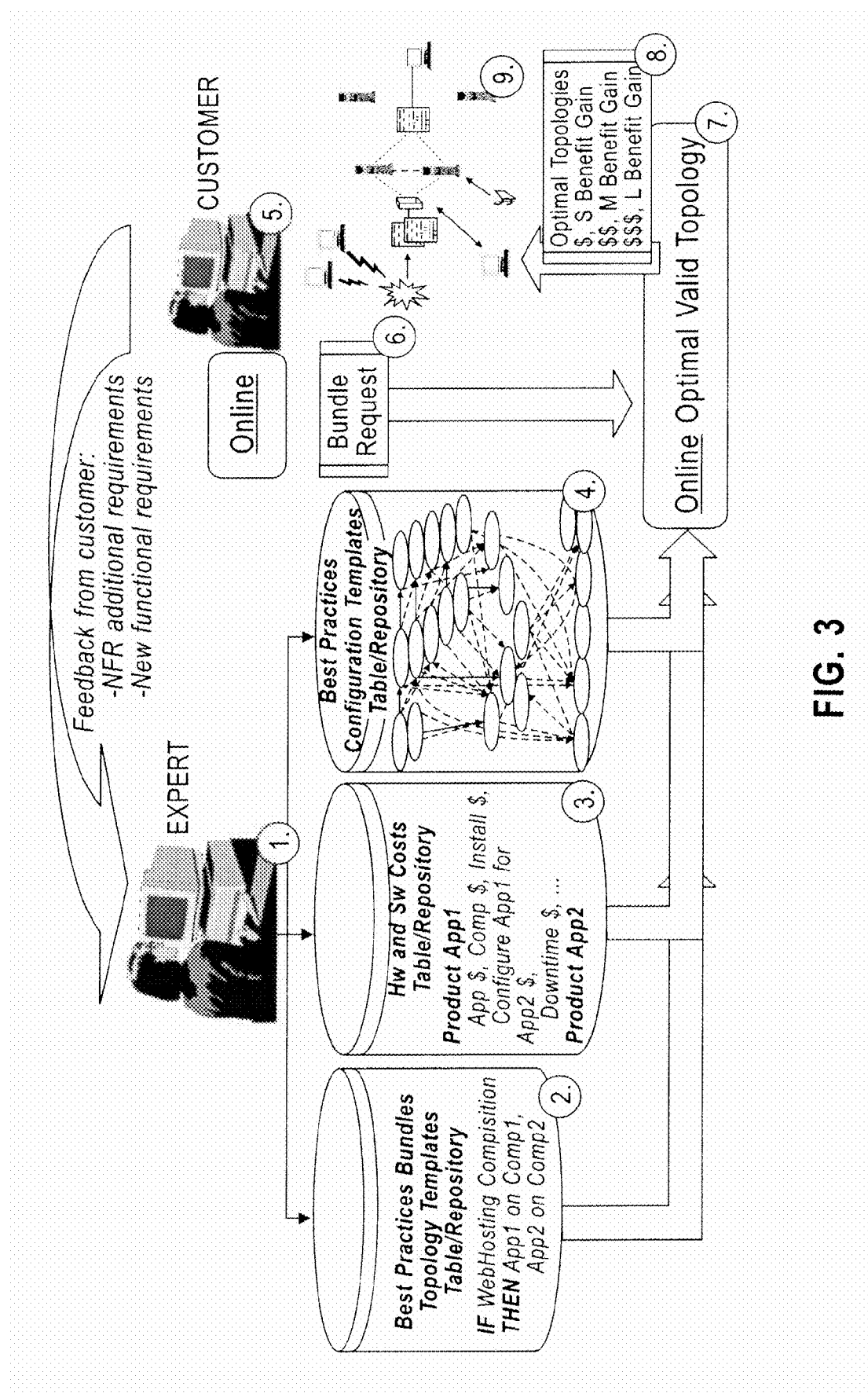
FIG. 3 illustrates a process for at least a semi-automated generation of topology templates and the use of such templates to derive an application solution in response to user criteria.

One non-limiting specific embodiment of an aspect of this invention is shown in FIG. 3. The embodiment provides at least for optimized resolutions in maintenance services. The Item 1 represents a process of collecting offline from one or more subject matter experts (Domain Experts) the following items: Item 2, rules concerning best practices bundled topologies and templates (e.g., stored in database 20); Item 3, costs related to the hardware and software products supported in the best practices templates; Item 4, constraints that reflect the best practices configuration templates supported by a specific service provider.

Item 2 can be implemented or represented as the database entry, such as a collection of files, or a file resource that stores rules about best practices bundle topology templates. Non-limiting examples of bundles topology rules are, for example:

IF an application requires more disk space than available on the selected VM (virtual machine), THEN add more disk space to the existing VM, or replace with a VM having a larger disk space, and/or add a storage area network (SAN) to the VM, and/or IF CPU requirement reaches 80%, THEN add more CPU to the existing VM, or add a new VM, or migrate the application to another VM with more CPU capacity.

Those skilled in the art should appreciate, however, that these are only examples of action rules and that any rule(s) may be used without departing from the embodiments of the present invention.

Item 3 represents a database (e.g., database 20), a collection of files, or a file resource that stores costs related to the products involved in the best practices topologies determined in Item 4. Examples of such costs are product cost, installation cost, cost of the necessary configuration to work with required products, cost of generated downtime, etc.

Item 4 represents a database (e.g., database 20), a collection of files, or a file resource that stores constraints and dependencies that reflect the best practices bundle templates supported by a specific service provider (e.g., the provider of the cloud platform). Examples of constraints that reflect best practices configurations include, for example: "Web application server M version a.b.c works with database server N version x.y.z"; "Web application server M version a.b.c works on version 9.1 of OS of SW Provider N".

A special type of configuration constraints are classes of equivalence rules that indicate which products provide similar functionality. Examples of classes of equivalence rules are: "Web application servers are: Web application server-1, Web application server-2, . . . , Web application server-n,"; and database application servers are: Database application server-1, Database application server-2, . . . , Database application server-n.

Software conflicts are another potential type of constraint. Examples of software conflicts constraints are: "Intrusion Protection Software A is unstable on Operating System B"; "Application server A on Operating System B conflicts with Web services manager C".

Those skilled in the art will appreciate, however, that these are only non-limiting examples of constraints and that any IT constraints and dependencies may be used without departing from the embodiments of the present invention.

It should also be appreciated that the "Expert" shown in Item 1 could be one or more human experts (e.g., one or more IT professionals), or that the "Expert" shown in Item 1 could be one or more "software" experts, such as one or more computer programs, such as an 'expert system', designed to incorporate the knowledge, expertise and decision-making rationale of one or more of such human experts.

Item 5 represents the customer, client or any personnel selecting for the customer the products and products bundles expressed as the set of requirements (Item 6). In a certain non-limiting embodiment the selected bundle is a multi-tiered e-commerce system that the client wishes in order to implement a particular business model. Such an exemplary e-commerce system can include the following subsystems connected by local and wide area networks: web based presentation systems, access systems, application business logic, messaging systems, database systems and storage subsystems—running on top of operating system(s) and specific hardware. In this example the client needs to determine what are the possible service options that accommodate the performance, the over-all service availability, and the SLAs (service level agreements) expressed in the business and IT requirements (item 6) and that are also cost effective for the client in the context of the cloud platform.

Item 6 represents a set of requirements that is input by the client to express a desired service/bundle. In a particular embodiment these can be expressed as drop-down lists of available options or as free text (depending on the specifics of the implemented user interface of the system 10) followed by the search in the bundled topologies database (Item 1).

Item 7 represents a process of generating the optimal bundle topology(ies) (see Item 8) for the client customer. Examples of steps to accomplish this process of Item 7 are detailed in the process diagram of FIG. 2. In general the technical evaluation of each potential topology is paired with the total cost of the solution including the installation cost and the operational cost. The costs can be computed using data stored in Item 3. The benefit of each potential bundle topology can then be calculated and the performance versus cost comparison can be provided to the client via the interface 18 for comparison and selection.

Item 8 represents a list of possible bundle options that accommodate the requirements (Item 6). Item 8 shows a process to allow the client to send feedback (Item 8') to the cloud platform provider with additional requirements when the bundle options in Item 9 do not lead to a final selection by the client. The additional requirements can be additional non-functional requirements (NFR) or new functional requirements. Upon receipt of the additional requirements the Domain Expert (Item 1) may enhance the topology repository to reflect the customer's requirements. This action can trigger a new search against the updated set of client requirements resulting in a new list of possible bundles options.

Item 9 represents a final cloud platform resource (hardware/software) bundle selection of the client.

The use of the exemplary embodiments of this invention provides a balance between cost and performance in selecting an instantiation of resources from a cloud platform. The exemplary embodiments enable a determination to be made if a cloud platform tool requests information related to a budget of a user (client) and technical requirements for a cloud platform solution needed by the client, as well as workloads and software from the client.

As will be appreciated by one skilled in the art aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium maybe, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, process flows and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A system comprising:
at least one computer connected with at least one memory that stores computer program code executable by the at least one computer; and
a user interface connected with the at least one computer;
where execution of the computer program code results in performance of operations that comprise,
in response to input from a user received via said user interface, accessing a database to select at least one predetermined template comprised of a hardware and software instance of a data processing system that is implementable as an application solution on a cloud platform, where the predetermined template is established by an expert and comprises rules concerning certain topologies, costs related to hardware and software products supported in the certain topologies, and constraints associated with the certain topologies;
comparing the at least one selected template against a set of constraints;
establishing an instance of a cloud based solution that is customized for the user based on the at least one selected template when the set of constraints is compatible with requirements of the at least one selected template, where the input from the user is comprised of a budgetary amount allocated by the user to establish the instance of the cloud based solution, and where the set of constraints comprises the budgetary amount and further comprises technical requirements of the user for the instance of the cloud based solution, where the technical requirements comprise any resiliency requirements of the user;
validating the established cloud based solution against user-uploaded software and workloads to ensure that the cloud based solution satisfies requirements of the user;
where establishing comprises:
based on specific requirements of the user selecting at least one of the certain topologies as a working template;
technically validating the working template against the requirements; and
generating the cloud based solution by varying combinations of hardware and software of the working template, where varying takes into consideration any resiliency requirements of the user and any licensing constraints of the user;
where technically validating the working template comprises:
testing the working template against user-uploaded software and workloads; and
where validating the established instance of the cloud based solution further comprises testing horizontal and vertical scaling capabilities and any resiliency requirements while considering pricing and any license constraints.

2. The system of claim 1, where the set of constraints further comprises license-related information associated with the user.

3. The system of claim 1, where new constraints are created or requested by the user to identify an instance of a cloud based solution having performance that exceeds performance of other instances of cloud based solutions within the user's financial requirements.

* * * * *